US009020776B2

(12) United States Patent
Friend (10) Patent No.: US 9,020,776 B2
(45) Date of Patent: Apr. 28, 2015

(54) INCLINATION ANGLE COMPENSATION SYSTEMS AND METHODS

(75) Inventor: Paul Russell Friend, Morton, IL (US)

(73) Assignee: Caterpillar Inc., Peoria, IL (US)

(*) Notice: Subject to any disclaimer, the term of this patent is extended or adjusted under 35 U.S.C. 154(b) by 597 days.

(21) Appl. No.: 13/247,679

(22) Filed: Sep. 28, 2011

(65) Prior Publication Data

US 2013/0080112 A1 Mar. 28, 2013

(51) Int. Cl.
| | |
|---|---|
| G01C 9/02 | (2006.01) |
| G06F 15/00 | (2006.01) |
| G05D 1/08 | (2006.01) |
| E02F 3/84 | (2006.01) |
| G01C 9/08 | (2006.01) |

(52) U.S. Cl.
CPC .............. *G05D 1/0891* (2013.01); *E02F 3/845* (2013.01); *G01C 9/08* (2013.01); *G05D 2201/0202* (2013.01)

(58) Field of Classification Search
CPC ............ G01C 9/08; G01C 9/00; G06F 15/00; G06F 7/00; G05B 23/02; G01B 11/26
USPC ......... 702/87, 93, 154, 141, 150, 95, 96, 104; 33/365; 701/480, 494, 30.5, 30.8; 73/1.38
See application file for complete search history.

(56) References Cited

U.S. PATENT DOCUMENTS

| | | | | |
|---|---|---|---|---|
| 4,531,300 | A * | 7/1985 | Heidel et al. ................ | 33/366.13 |
| 5,265,472 | A * | 11/1993 | Pfeifle et al. ............... | 73/514.02 |
| 5,860,480 | A | 1/1999 | Jayaraman et al. | |
| 6,332,353 | B1 * | 12/2001 | Gesele et al. ............... | 73/117.01 |
| 6,481,295 | B1 * | 11/2002 | Schoch ....................... | 73/862.06 |
| 6,502,055 | B1 | 12/2002 | Reiner et al. | |
| 6,622,091 | B2 | 9/2003 | Perlmutter et al. | |
| 6,810,738 | B2 * | 11/2004 | Sakaguchi ................... | 73/510 |
| 6,928,382 | B2 * | 8/2005 | Hong et al. .................. | 702/141 |
| 7,206,694 | B2 | 4/2007 | Huddle et al. | |
| 7,289,898 | B2 * | 10/2007 | Hong et al. .................. | 701/96 |
| 7,650,252 | B2 * | 1/2010 | Douglas ...................... | 702/95 |
| 7,650,752 | B2 | 1/2010 | Oohara | |
| 8,219,451 | B2 * | 7/2012 | Kreidler et al. ............. | 705/26.1 |
| 8,340,860 | B2 * | 12/2012 | Kobayashi et al. ......... | 701/30.8 |
| 8,380,458 | B2 * | 2/2013 | Wengler ...................... | 702/141 |
| 8,494,710 | B2 * | 7/2013 | Harvie ........................ | 701/33.1 |

(Continued)

OTHER PUBLICATIONS

"MEMS Capacitive Accelerometers, Application Notes Tilt/Inclination Sensing," Colibrys, Inc., www.colibrys.com (2 pages). Mar. 14, 2011.

*Primary Examiner* — Carol S Tsai
(74) *Attorney, Agent, or Firm* — Finnegan, Henderson, Farabow, Garrett & Dunner, LLP (57) ABSTRACT

An inclination angle compensation system for determining an inclination angle of a machine is disclosed. The inclination angle compensation system may have a non-gravitational acceleration estimator configured to estimate a non-gravitational acceleration of a machine based on an estimated inclination angle and an acceleration output from a forward acceleration sensor. The inclination angle compensation system may also have an inclination angle sensor corrector configured to receive an inclination angle output from an inclination angle sensor, determine an inclination angle sensor acceleration based on the inclination angle output, and calculate a corrected inclination angle of the machine based on the non-gravitational acceleration and the inclination angle sensor acceleration.

14 Claims, 5 Drawing Sheets

(56) References Cited

U.S. PATENT DOCUMENTS

| | | | |
|---|---|---|---|
| 8,566,034 B1* | 10/2013 | Van Wyck Loomis | 701/480 |
| 2002/0002859 A1* | 1/2002 | Gesele et al. | 73/117.2 |
| 2004/0007064 A1* | 1/2004 | Sakaguchi | 73/488 |
| 2006/0293826 A1* | 12/2006 | Hong et al. | 701/96 |
| 2009/0312974 A1* | 12/2009 | Douglas | 702/93 |
| 2010/0250117 A1* | 9/2010 | Deker et al. | 701/202 |
| 2011/0125454 A1* | 5/2011 | Wengler | 702/141 |
| 2012/0150294 A1* | 6/2012 | Weinberg et al. | 623/10 |
| 2012/0253585 A1* | 10/2012 | Harvie | 701/29.1 |

* cited by examiner

INCLINATION ANGLE COMPENSATION SYSTEMS AND METHODS

TECHNICAL FIELD

The present disclosure relates generally to an inclination compensation system, and more particularly, to an inclination angle compensation system for non-gravity accelerations.

BACKGROUND

Machines such as, for example, dozers, motor graders, wheel loaders, wheel tractor scrapers, and other types of heavy equipment are used to perform a variety of tasks. The completion of some of these tasks require operation on or near inclines that, if inappropriately traversed by a machine, have the potential to roll the machine over, resulting in equipment damage and possible injury to the operator. When under the direct control of a human operator, the likelihood of rollover may be estimated by the operator and appropriate avoidance measures manually implemented. However, in some situations, rollover may be difficult for the operator to anticipate and, without suitable automated safety measures in place, rollover may be unavoidable. This rollover potential may be even greater when the machine is remotely, autonomously, or semi-autonomously controlled.

Remotely controlled, autonomously controlled, and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. For example, a determined inclination angle of the machine should be accurate for all ranges of inclination angles.

An exemplary system that may be used to determine the inclination angle of a machine is disclosed in U.S. Pat. No. 6,502,055 to Reiner that issued on Dec. 31, 2002 ("the '055 patent). The system of the '055 patent is capable of determining the inclination angle of a machine using an output from an accelerometer mounted on the machine to measure the acceleration $a_x$ in the forward direction due exclusively to gravity. The system of the '055 patent then calculates the inclination angle (or pitch) of the machine, $\theta$, using the following equation:

$$\theta = \sin^{-1}\left(\frac{a_x}{g}\right) \quad (1)$$

Although the system of the '055 patent may be useful for determining an inclination angle of a machine, the system may not provide accurate inclination data for all inclination angles. For example, non-gravity induced accelerations may cause the inclination angle determination to be inaccurate. Further, the inclination angle determinations made using equation (1) may only be accurate for small inclination angles.

The disclosed inclination compensation system is directed to overcoming one or more of the problems set forth above and/or other problems of the prior art.

SUMMARY

In one aspect, the present disclosure is directed to an inclination angle compensation system for determining an inclination angle of a machine. The system may include a non-gravitational acceleration estimator configured to estimate a non-gravitational acceleration of a machine based on an estimated inclination angle and an acceleration output from a forward acceleration sensor. The system may also include an inclination angle sensor corrector configured to receive an inclination angle output from an inclination angle sensor, and determine an inclination angle sensor acceleration based on the inclination angle output. The inclination angle sensor corrector may also be configured to calculate a corrected inclination angle of the machine based on the non-gravitational acceleration and the inclination angle sensor acceleration.

In another aspect, the present disclosure is directed to a computer-implemented method of determining an inclination of a machine. The method may include estimating a non-gravitational acceleration of a machine based on an estimated inclination angle and an acceleration output from a forward acceleration sensor, and receiving an inclination angle output from an inclination angle sensor. The method may also include determining an inclination angle sensor acceleration based on the inclination angle output, and calculating a corrected inclination angle of the machine based on the non-gravitational acceleration and the inclination angle sensor acceleration.

In yet another aspect, the present disclosure is directed to a computer-readable storage device storing instructions for determining an inclination of a machine. The instructions may cause one or more computer processors to perform operations including estimating a non-gravitational acceleration of a machine based on an estimated inclination angle and an acceleration output from a forward acceleration sensor, and receiving an inclination angle output from an inclination angle sensor. The operations may also include determining an inclination angle sensor acceleration based on the inclination angle output, and calculating a corrected inclination angle of the machine based on the non-gravitational acceleration and the inclination angle sensor acceleration.

DETAILED DESCRIPTION

Figure 1:
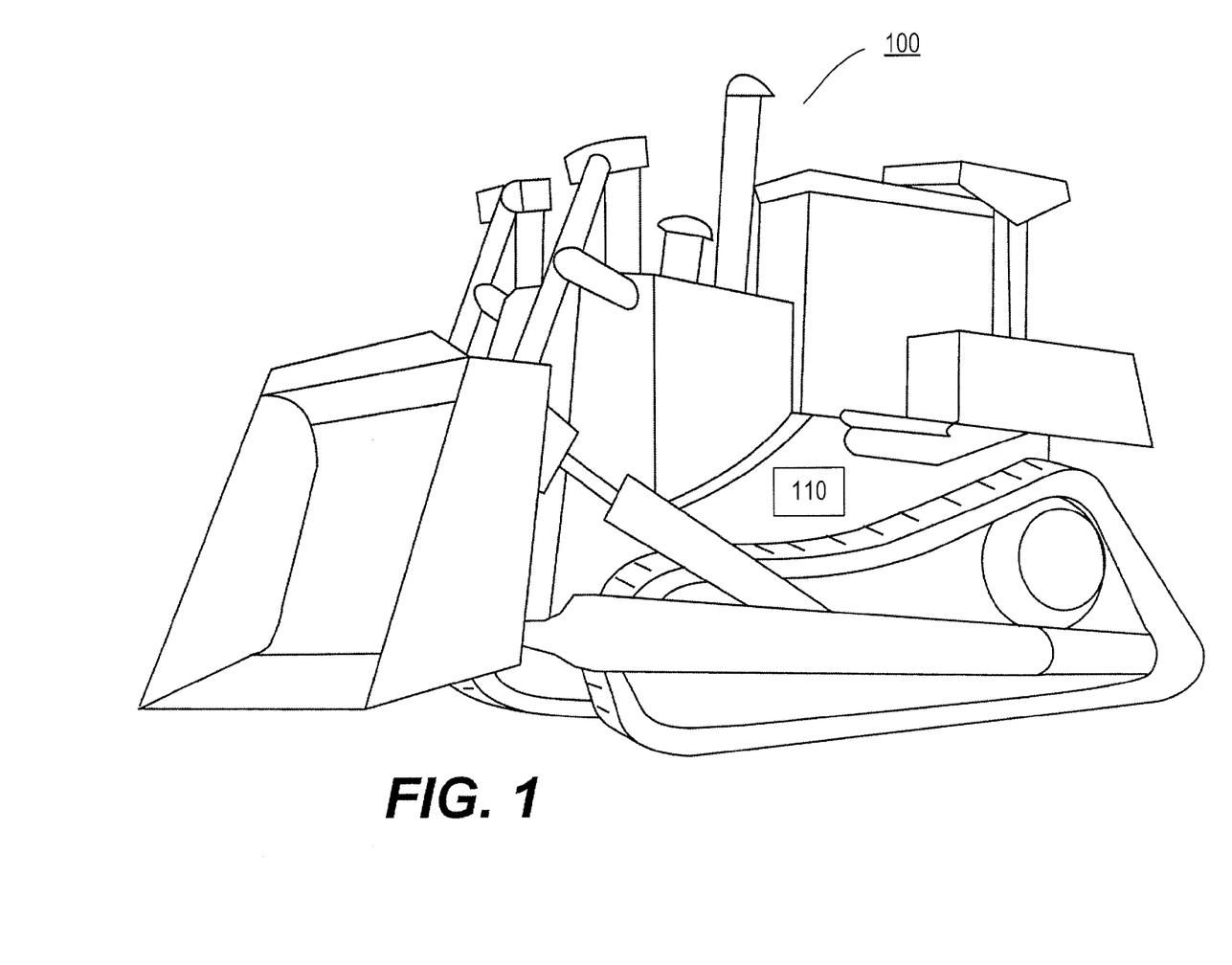
FIG. 1 is a pictorial illustration of an exemplary disclosed machine.

FIG. 1 illustrates a machine 100 having an exemplary disclosed inclination angle compensation system 110. Machine 100 may embody a machine configured to perform some type of operation associated with an industry such as mining, construction, farming, transportation, power generation, or any other industry known in the art. For example, machine 100 may be an earth moving machine such as a haul truck, a dozer, a loader, a backhoe, an excavator, a motor grader, a wheel tractor scraper, or any other earth moving machine.

Inclination angle compensation system 110 may include components that gather information from machine 100 during operation of machine 100. For example, inclination angle compensation system 110 may include various sensors, e.g., accelerometers, gyroscopes, global positioning system (GPS) devices, radar devices, etc., that may be used to measure, e.g., location, horizontal, vertical, and forward velocities and accelerations, inclination angle (e.g., pitch), inclination angular rate, heading, yaw rate, roll angle, roll rate, etc. Inclination angle compensation system 110 may also include any combination of hardware and/or software capable of executing one or more computer programs that may include algorithms, e.g., an inclination angle correction algorithm, a Kalman filter algorithm, etc., to process the measurements made by the various sensors.

Figure 2:
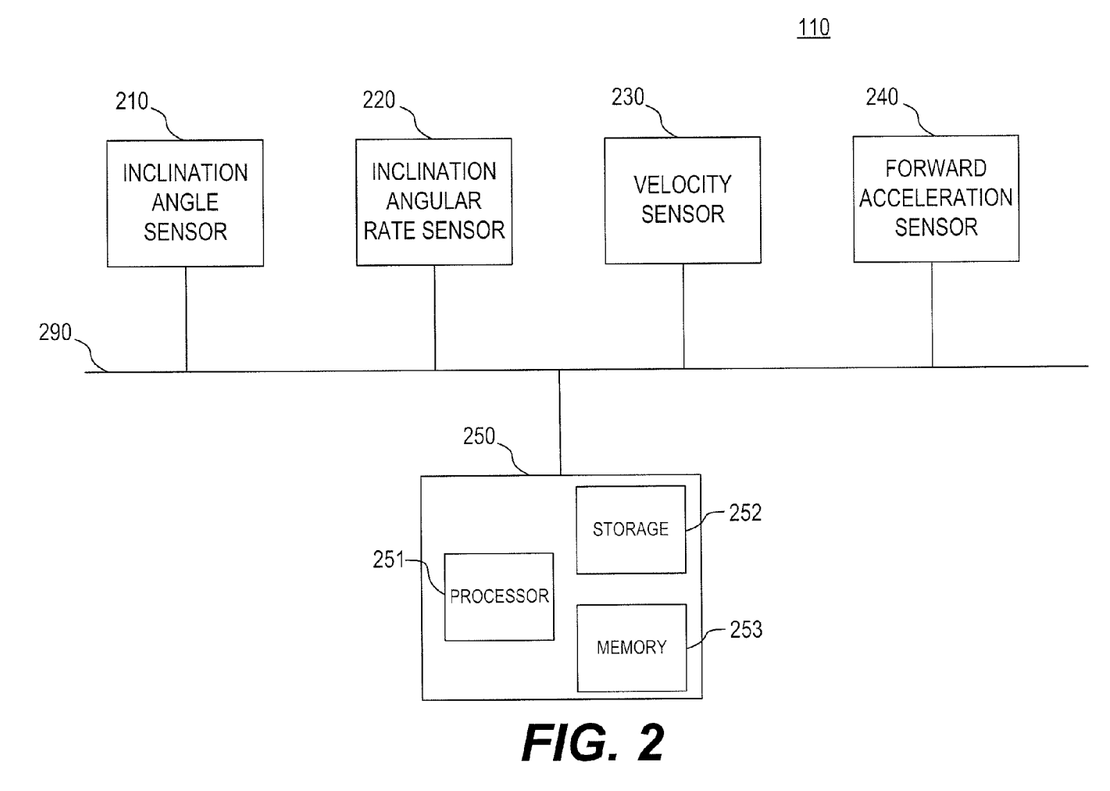
FIG. 2 is a diagrammatic illustration of an exemplary disclosed inclination compensation system that may be used in conjunction with the machine of FIG. 1.

FIG. 2 illustrates an exemplary inclination angle compensation system 110 that may be used in conjunction with machine 100. Inclination angle compensation system 110 may include an inclination angle sensor 210, an inclination angular rate sensor 220, a velocity sensor 230, a forward acceleration sensor 240, and a controller 250 connected to each other via bus 290. While a bus architecture is shown in FIG. 2, any suitable architecture may be used, including any combination of wired and/or wireless networks. Additionally, such networks may be integrated into any local area network, wide area network, and/or the Internet.

Inclination angle sensor 210 may include any device capable of measuring the inclination angle, e.g., pitch, of a machine. For example, inclination angle sensor 210 may include one or more accelerometers and/or pendulous-based inclinometers capable of measuring the inclination angle of a machine along one or more axes. Similarly, inclination angular rate sensor 220 may include any device capable of measuring the inclination angular rate of change, e.g., pitch rate, of a machine. For example, inclination angular rate sensor 220 may include one or more accelerometers and/or gyroscopes. In certain embodiments, inclination angle sensor 210 and inclination angular rate sensor 220 may be incorporated in a single device.

Velocity sensor 230 may include any device capable of measuring a machine's velocity. For example, velocity sensor 230 may include one or more global positioning system (GPS) receivers, one or more radar-based devices, one or more sensors positioned on a wheel or axle of machine 100, one or more sensors or other devices for measuring transmission speed, etc. Forward acceleration sensor 240 likewise may include any device capable of measuring a machine's forward acceleration. For example, forward acceleration sensor 240 may include one or more accelerometers and/or may include hardware and/or software capable of calculating acceleration values from a time series output of velocity sensor 230.

Controller 250 may include processor 251, storage 252, and memory 253, included together in a single device and/or provided separately. Processor 251 may include one or more known processing devices, such as a microprocessor from the Pentium™ or Xeon™ family manufactured by Intel™, the Turion™ family manufactured by AMD™, any of various processors manufactured by Sun Microsystems, or any other type of processor. Memory 253 may include one or more storage devices configured to store information used by controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one embodiment, memory 253 may include one or more inclination angle compensation programs or subprograms loaded from storage 252 or elsewhere that, when executed by processor 251, perform various procedures, operations, or processes consistent with disclosed embodiments. For example, memory 253 may include one or more programs that enable controller 250 to, among other things, collect data from sensors 210-240, process the data according to disclosed embodiments such as those embodiments discussed with regard to FIGS. 3A-3B, and determine an inclination angle of a machine based on the processed data.

In certain embodiments, memory 253 may include an inclination angle compensation program enabling controller 250 to calculate a corrected inclination angle based on, e.g., an estimated non-gravitational acceleration and an acceleration sensed by inclination angle sensor 210. In one embodiment, the inclination angle compensation program may enable controller 250 to estimate the non-gravitational acceleration based on an output from forward acceleration sensor 240 and an estimated inclination angle that is estimated by integrating an output from inclination angular rate sensor 220.

In certain embodiments, memory 253 may include a program enabling controller 250 to process the data using a Kalman filter. A Kalman filter is a mathematical method that may be used to determine accurate values of measurements observed over time, such as measurements taken in a time series. The Kalman filter's general operation involves two phases, a propagation or "predict" phase and a measurement or "update" phase. In the predict phase, the value estimate from the previous timestep in the time series is used to generate an a priori value estimate. In the update phase, the a priori estimate calculated in the predict phase is combined with an estimate of the accuracy of the a priori estimate (e.g., the variance), and a current measurement value to produce a refined a posteriori estimate.

Figure 3A:
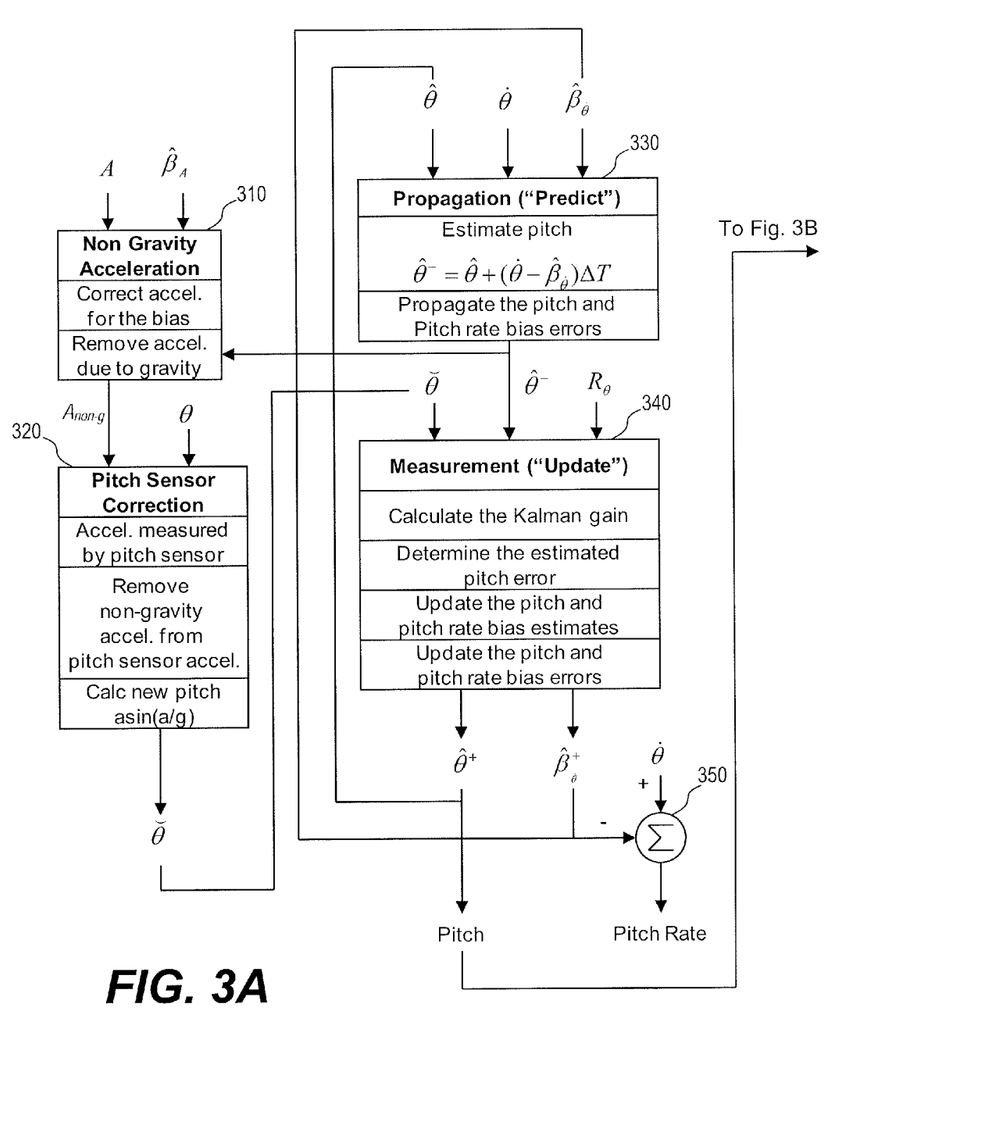
FIGS. 3A and 3B are diagrammatic illustrations of an exemplary disclosed inclination compensation device that may be used in conjunction with the machine of FIG. 1.
Figure 3B:
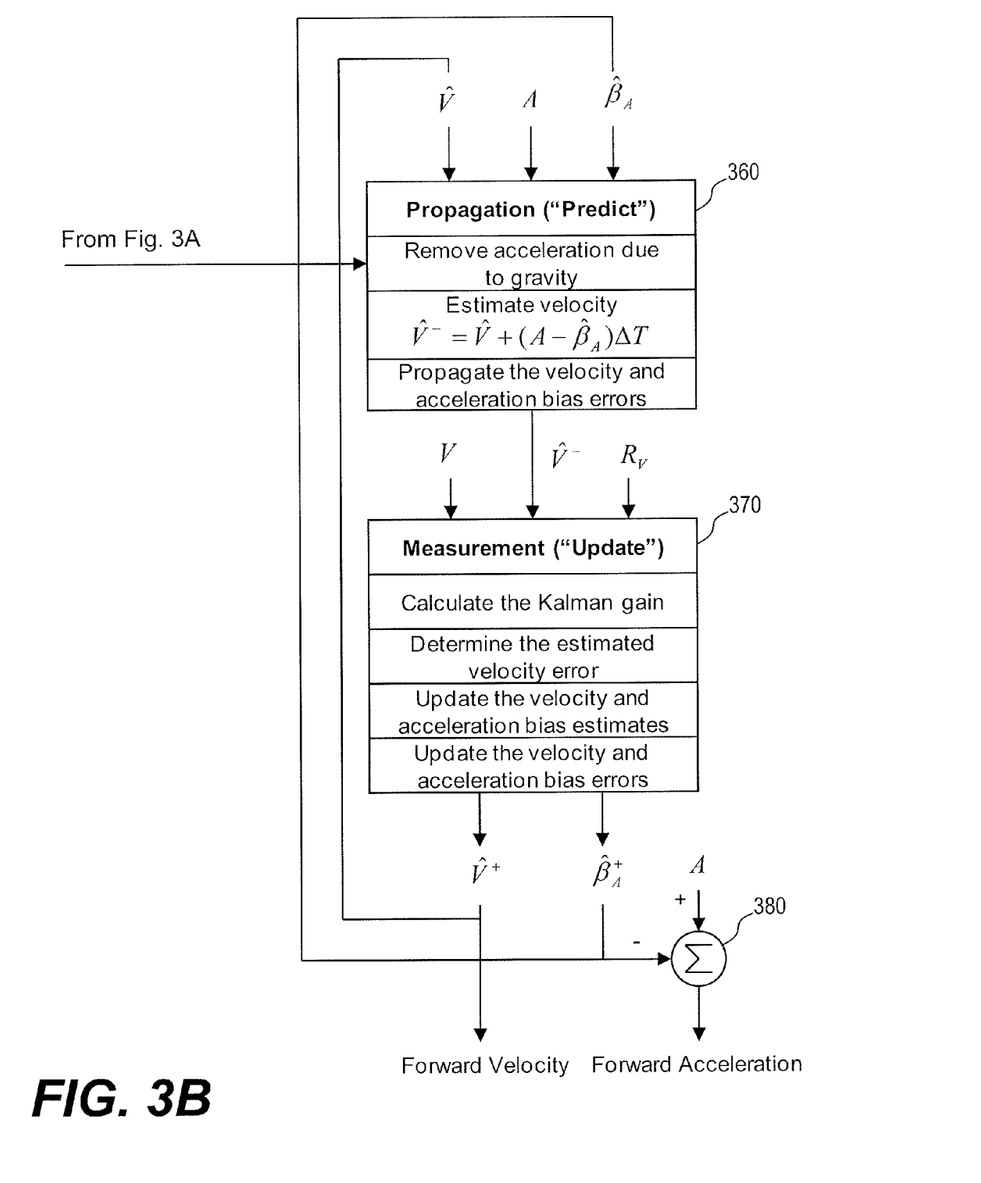

FIGS. 3A and 3B illustrate an exemplary embodiment of controller 250, which may function as an inclination angle compensation device. Controller 250 may include a non-gravitational acceleration estimator 310, an inclination angle sensor corrector 320, an inclination angle estimator 330, an inclination angle updater 340, a summer 350, a forward velocity estimator 360, a forward velocity updater 370, and a summer 380. Although the components included in controller 250 are shown as separate components, they may be implemented in any combination of hardware and/or software. For example, in one embodiment, the components in controller 250 shown in FIGS. 3A and 3B may be implemented in the form of software stored on one or more of storage 252 and/or memory 253 that, when executed by processor 251, enable controller 250 to perform functions related to disclosed embodiments.

Non-gravitational acceleration estimator 310 may be configured to estimate a non-gravitational acceleration of a machine. For example, non-gravitational acceleration estimator may be configured to receive an acceleration output A from forward acceleration sensor 240, an acceleration bias estimate $\hat{\beta}_A$ from forward velocity updater 370, and an estimated inclination angle $\hat{\theta}^-$ from inclination angle estimator 330 and may output an estimated non-gravitational acceleration $A_{non-g}$. In one embodiment, non-gravitational acceleration estimator 310 may estimate the non-gravitational acceleration by correcting for the acceleration bias and removing an estimate of the gravitational acceleration component, according to the following equation:

$$A_{non-g} = A - \hat{\beta}_A - g \sin \hat{\theta} \quad (2)$$

where g is a conventional acceleration due to gravity, e.g., approximately 9.81 m/s² or 32.19 ft/s² on earth. As discussed in greater detail below with regard to forward velocity updater 370 and inclination angle estimator 330, in certain embodiments, acceleration bias estimate $\hat{\beta}_A$ and estimated inclination angle $\hat{\theta}^-$ may be an a posteriori acceleration bias estimate and an a priori estimated inclination angle, respectively, that may output from Kalman filters. Further, while an acceleration bias value is used in equation (2), in certain embodiments an acceleration bias value may not be used and the gravitational acceleration component may simply be subtracted from the acceleration measured by forward acceleration sensor 240 in order to obtain the estimated non-gravitational acceleration $A_{non-g}$.

Inclination angle sensor corrector 320 may be configured to output a corrected inclination angle sensor value based on the non-gravitational acceleration $A_{non-g}$ estimated by non-gravitational acceleration estimator 310 and the inclination angle θ measured by inclination angle sensor 210. For example, inclination angle sensor corrector 320 may be configured to receive non-gravitational acceleration $A_{non-g}$ and inclination angle θ, and to output a corrected inclination angle $\check{\theta}$.

In one embodiment, inclination angle sensor corrector 320 may calculate the corrected inclination angle $\check{\theta}$ by calculating an inclination angle sensor acceleration based on the inclination angle measured by inclination angle sensor 210, removing the estimated non-gravitational acceleration from the acceleration measured by inclination angle sensor 210, and calculating the corrected inclination angle based on the remaining acceleration value. For example, inclination angle sensor corrector 320 may calculate the inclination angle sensor acceleration based on the inclination angle measured by inclination sensor 210 using the following equation:

$$A_i = g \sin \theta \quad (3)$$

where $A_i$ is the calculated acceleration measured by inclination angle sensor 210, g is a conventional acceleration due to gravity, e.g., approximately 9.81 m/s² or 32.19 ft/s², and θ is the inclination angle output from inclination angle sensor 210. Inclination angle sensor corrector 320 may then subtract the non-gravitational acceleration from $A_i$, divide the result by g, and take the arcsine to calculate the corrected inclination angle sensor value. For example, inclination angle sensor corrector 320 may calculate the corrected inclination angle $\check{\theta}$ according to the following equation:

$$\check{\theta} = \sin^{-1}\left(\frac{A_i - A_{non-g}}{g}\right) \quad (4)$$

where $A_i$ is the inclination angle sensor acceleration calculated based on the inclination angle output, $A_{non-g}$ is the non-gravitational acceleration, and g is a conventional acceleration due to gravity.

While the arcsine is used above with respect to equation (4), other functions, including, e.g., the arctangent may be used to calculate the corrected inclination angle. Further, the choice of function may be based on the type of inclination angle sensor used. For example, if the inclination sensor is accelerometer-based, then the arcsine may be used, and if the inclination angle sensor is pendulous-based, then the arctangent may be used.

In certain embodiments, non-gravitational acceleration estimator 310 and inclination angle sensor corrector 320 may alone function as an inclination angle compensation device. In other embodiments, non-gravitational acceleration estimator 310 and inclination angle sensor corrector 320 may be combined with one or more Kalman filters to function as an inclination angle compensation device. For example, as shown in FIGS. 3A and 3B, an inclination angle compensation device may include a Kalman filter for estimating a machine's inclination angle as well as a Kalman filter for estimating a machine's velocity. The integration of non-gravitational acceleration estimator 310 and inclination angle sensor corrector 320 with one or more Kalman filters is discussed in greater detail below.

Inclination angle estimator 330 may be configured to calculate an a priori estimated inclination angle of the machine based on a previously estimated inclination angle. In one embodiment, inclination angle estimator 330 may be configured to determine a Kalman filter a priori estimate for an inclination angle of a machine. For example, inclination angle estimator 330 may receive an a posteriori estimated inclination angle $\hat{\theta}$ and an inclination angular rate bias estimate $\hat{\beta}_{\dot{\theta}}$ calculated by inclination angle updater 340 in a previous timestep. Inclination angle estimator 330 may also receive a measured inclination angular rate value $\dot{\theta}$ from inclination angular rate sensor 220. Inclination angle estimator 330 may use this data to calculate an a priori estimated inclination angle of the machine. For example, inclination angle estimator 330 may calculate the a priori estimated inclination angle by integrating the measured inclination angular rate values received from inclination angular rate sensor 220. In one embodiment, inclination angle estimator 330 may calculate the a priori estimated inclination angle in accordance with the following equation:

$$\hat{\theta}^- = \hat{\theta} + (\dot{\theta} - \hat{\beta}_{\dot{\theta}})\Delta T \quad (5)$$

where $\hat{\theta}^-$ equals the a priori estimated inclination angle, $\hat{\theta}$ equals the a posteriori estimated inclination angle calculated from a previous timestep, $\dot{\theta}$ equals the measured inclination angular rate value, $\hat{\beta}_{\dot{\theta}}$ equals the inclination angular rate bias estimate calculated from a previous timestep, and $\Delta T$ equals the time between timesteps in the Kalman filter. While a linear-extrapolation based method is used above in equation (5) to integrate the inclination angular rate values, any other method may be used to calculate the a priori estimated inclination angle, including, e.g., curve fitting analysis, regression analysis, estimates based on previously collected data, etc.

Inclination angle estimator 330 may also be configured to calculate a measurement variance of the inclination angle. The inclination angle measurement variance may be calculated in any way consistent with disclosed embodiments. For example, in one embodiment, the inclination angle measurement variance may be calculated to be proportional to the inclination angular rate value, e.g., from inclination angular rate sensor 220. Inclination angle estimator 330 may be configured to output the a priori estimated inclination angle and inclination angle measurement variance to other components, e.g., inclination angle updater 340 and/or non-gravitational acceleration estimator 310. For example, inclination angle estimator 330 may output the a priori estimated inclination angle $\hat{\theta}^-$ to non-gravitational acceleration estimator 310 to be used to estimate the non-gravitational acceleration in accordance with equation (2), above.

Inclination angle updater 340 may be configured to determine an a posteriori estimated inclination angle of the machine based on the a priori estimated inclination angle, the measurement variance of the inclination angle, and the corrected inclination angle. For example, inclination angle updater 340 may be configured to receive a corrected inclination angle $\hat{\theta}$ from inclination angle sensor corrector 320, the a priori estimated inclination angle $\hat{\theta}^-$ from inclination angle estimator 330, and the measurement variance $R_\theta$ of the estimated inclination angle. In certain embodiments, measurement variance $R_\theta$ of the estimated inclination angle may be the inclination angle measurement variance calculated by inclination angle estimator 330, discussed above. In other embodiments the measurement variance $R_\theta$ of the estimated inclination angle may be calculated based on the inclination angle measurement variance.

In one embodiment, inclination angle updater 340 may be configured to determine a Kalman filter a posteriori estimate for an inclination angle of a machine. For example, inclination angle updater 340 may use the measured inclination angle, the a priori estimated inclination angle, and the measurement variance of the estimated inclination angle to calculate the Kalman gain and determine the a posteriori estimated inclination angle, the a posteriori estimated inclination angular rate, and the estimated bias for each value. Inclination angle updater 340 may output the a posteriori estimated inclination angle to inclination angle estimator 330 and/or to forward velocity estimator 360 (discussed in greater detail below). Inclination angle updater 340 may also output the a posteriori estimated inclination angular rate bias to inclination angle estimator 330 and to summer 350. Summer 350 may subtract the a posteriori estimated inclination angular rate bias from the measured inclination angular rate received, e.g., from inclination angular rate sensor 220, to generate an estimated inclination angular rate, e.g., a pitch rate.

Forward velocity estimator 360 may be configured to calculate an a priori estimated velocity of the machine based on a previously estimated velocity. In one embodiment, forward velocity estimator 360 may be configured to determine a Kalman filter a priori estimate for a velocity of a machine. For example, forward velocity estimator 360 may receive an a posteriori estimated velocity $\hat{V}$ and an acceleration bias estimate $\hat{\beta}_A$ calculated by forward velocity estimator 360 in a previous timestep. Forward velocity estimator 360 may also receive an acceleration value A, e.g., from forward acceleration sensor 240. Forward velocity estimator 360 may use this data to calculate an a priori estimated velocity of the machine. For example, in one embodiment, forward velocity estimator 360 may calculate the a priori estimated velocity by integrating the measured acceleration values received from forward acceleration sensor 240. In one embodiment, forward velocity estimator 360 may calculate the a priori estimated inclination angle in accordance with the following equation:

$$\hat{V}^- = \hat{V} + (A - \hat{\beta}_A)\Delta T \qquad (6)$$

where $\hat{V}^-$ equals the a priori estimated velocity, $\hat{V}$ equals the a posteriori estimated velocity from a previous timestep, A equals the acceleration value, $\hat{\beta}_A$ equals the a posteriori acceleration bias estimate from a previous timestep, and $\Delta T$ equals the time between timesteps in the Kalman filter. While a linear extrapolation method is used above in equation (6) to integrate the acceleration values, any other method may be used to calculate the a priori estimated velocity, including, e.g., curve fitting analysis, regression analysis, estimates based on previously collected data, etc.

In certain embodiments, forward velocity estimator 360 may also be configured to receive the a posteriori estimated inclination angle from inclination angle updater 340. Forward velocity estimator 360 may use the a posteriori estimated inclination angle to calculate the amount of acceleration due to gravity, and may subtract the amount of acceleration due to gravity from the acceleration value received from forward acceleration sensor 240. Forward velocity estimator 360 may then use the resulting acceleration value as the acceleration value in equation (5) above for calculating the a priori estimated forward velocity.

Forward velocity estimator 360 may also be configured to calculate a forward velocity measurement variance. The forward velocity measurement variance may be calculated in any way consistent with disclosed embodiments. For example, in one embodiment, the forward velocity measurement variance may be calculated to be proportional to the velocity or acceleration of the machine.

Forward velocity updater 370 may be configured to determine an a posteriori estimated forward velocity of the machine based on the a priori estimated forward velocity, the forward velocity measurement variance, and the measured velocity. For example, forward velocity updater 370 may be configured to receive a measured velocity value V from velocity sensor 230, the a priori estimated forward velocity $\hat{V}^-$ from forward velocity estimator 360, and the forward velocity measurement variance $R_V$.

In one embodiment, forward velocity updater 370 may be configured to determine a Kalman filter a posteriori estimate for the forward velocity of a machine. For example, forward velocity updater 370 may use the measured forward velocity, the a priori estimated forward velocity, and the forward velocity measurement variance to calculate the Kalman gain and determine the a posteriori estimated forward velocity, the a posteriori estimated forward acceleration, and the estimated bias for each value. Forward velocity updater 370 may output the a posteriori estimated forward velocity $\hat{V}^+$ to forward velocity estimator 360. Forward velocity updater 370 may also output the a posteriori estimated forward acceleration bias $\hat{\beta}_A^+$ to non-gravitational acceleration estimator 310, forward velocity estimator 360, and summer 380. Summer 380 may subtract the a posteriori estimated forward acceleration error from the measured forward acceleration A received, e.g., from forward acceleration sensor 240, to generate an estimated forward acceleration value.

While embodiments discussed above measure forward velocity and acceleration as well as forward inclination angle (pitch) and inclination angular rate of change (pitch rate), one of skill in the art will understand that these embodiments may also be used to measure velocity, acceleration, inclination angle, and inclination angular rate of change in any direction. For example, certain embodiments may use a similar process to estimate roll, roll rates, yaw, and yaw rates of a machine. In one embodiment, inclination angles may be estimated in multiple directions on a single machine.

INDUSTRIAL APPLICABILITY

The disclosed inclination angle compensation system 110 may be applicable to any machine where accurate calculation of the machine's inclination angle is desired. The disclosed inclination angle compensation system may provide for improved calculation of a machine's inclination angle through the use of a Kalman filter approach that takes into account the non-gravitational acceleration of the machine. The operation of inclination angle compensation system 110 will now be described in connection with the flowchart of FIG. 4.

Figure 4:
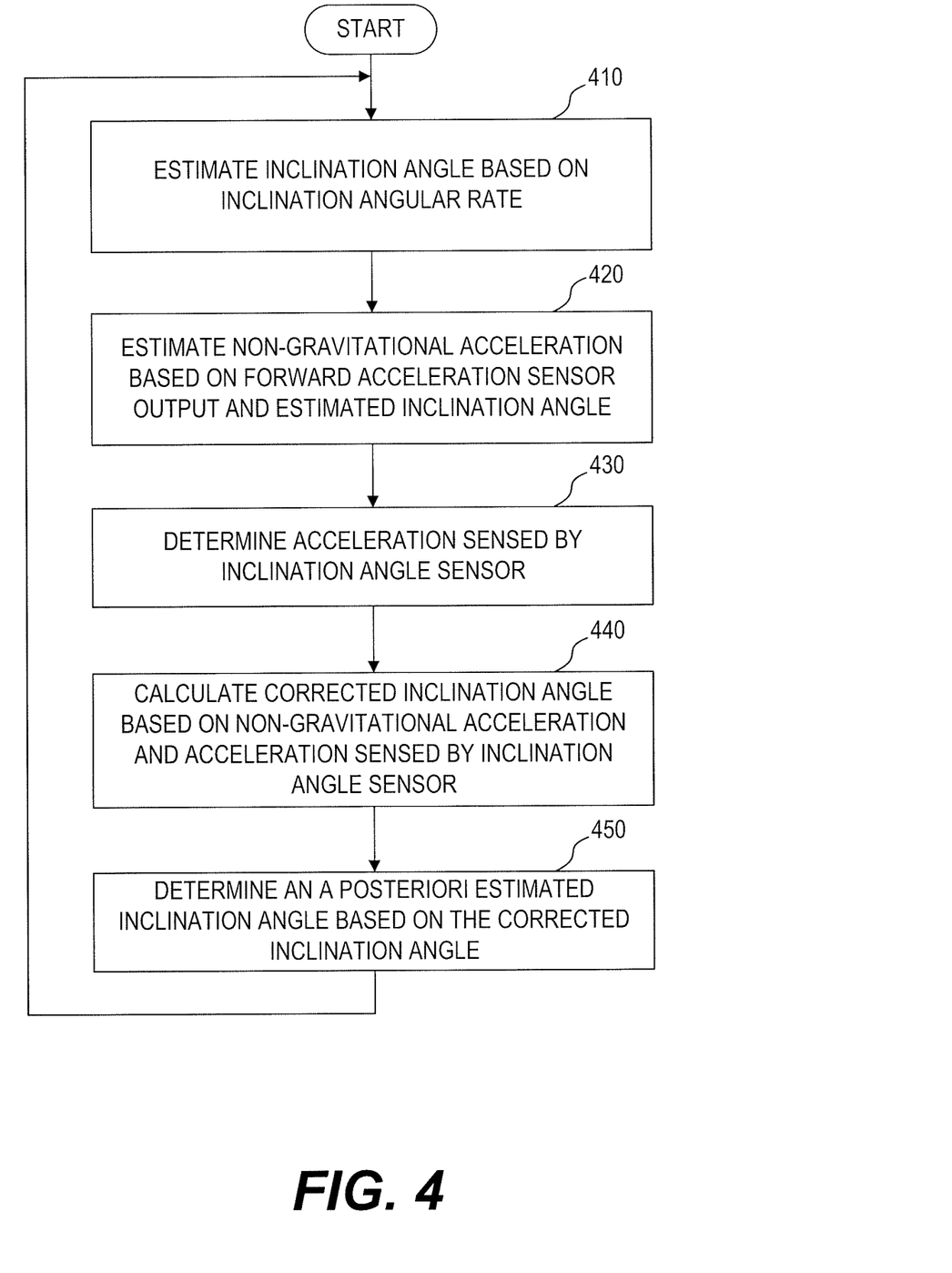
FIG. 4 is a flowchart depicting an exemplary disclosed method that may be performed by the system of FIG. 2 and/or the devices of FIGS. 3A-3B.

During operation of inclination angle compensation system 110, controller 250 may estimate an inclination angle based on a measured inclination angular rate (step 410). For example, controller 250 may determine a Kalman filter a priori estimated inclination angle by integrating the measured inclination angular rate values received, e.g., from inclination angular rate sensor 220. In one embodiment, controller 250 may calculate the a priori estimated inclination angle in accordance equation (5), discussed above. Further, while a linear-extrapolation based method is used above in equation (5), controller 250 may use any other method may to calculate the a priori estimated inclination angle, including, e.g., curve fitting analysis, regression analysis, estimates based on previously collected data, etc.

Controller 250 may also estimate the non-gravitational acceleration based on an output from forward acceleration sensor 240 and the estimated inclination angle calculated in step 410 (step 420). For example, controller 250 may estimate the non-gravitational acceleration by compensating for the acceleration bias and removing an estimate of the gravitational acceleration component, according to equation (2), discussed above. Further, while an acceleration bias value is used in equation (2), in certain embodiments an acceleration bias value may not be used and the gravitational acceleration component may simply be subtracted from the acceleration measured by forward acceleration sensor 240.

Controller 250 may also determine the acceleration sensed by inclination angle sensor 210, e.g., based on a measured inclination angle output from inclination angle sensor 210 (step 430). For example, controller 250 may calculate the inclination angle sensor acceleration based on the inclination angle measured by inclination sensor 210 in accordance with equation (3), discussed above.

Controller 250 may also calculate a corrected inclination angle based on the non-gravitational acceleration estimated in step 420 and the acceleration sensed by inclination angle sensor 210, determined in step 430 (step 440). For example, controller 250 may calculate the corrected inclination angle by removing the estimated non-gravitational acceleration calculated in step 420 from the acceleration measured by inclination angle sensor 210, determined in step 430, and calculating the corrected inclination angle based on the remaining acceleration value. In one embodiment, controller 250 may calculate the corrected inclination angle in accordance with equation (4), discussed above. While the arcsine is used above with respect to equation (4), other functions, including, e.g., the arctangent may be used to calculate the corrected inclination angle. Further, the choice of function may be based on the type of inclination angle sensor used. For example, if the inclination sensor is accelerometer-based, then the arcsine may be used, and if the inclination angle sensor is pendulous-based, then the arctangent may be used.

Controller 250 may also determine an a posteriori estimated inclination angle based on the corrected inclination angle (step 450). For example, controller 250 may determine a Kalman filter a posteriori estimate for an inclination angle of a machine. Controller 250 may use the measured inclination angle, the a priori estimated inclination angle, and a measurement variance of the estimated inclination angle to calculate the Kalman gain and determine the a posteriori estimated inclination angle, the a posteriori estimated inclination angular rate, and the estimated bias for each value.

The disclosed inclination angle compensation system may allow for accurate calculation of inclination angles. In particular, the system may allow for accurate calculation of inclination angles for all possible inclination angles of a machine. Further, accurate measurement of the inclination angle may aid in the safe operation of the machine.

It will be apparent to those skilled in the art that various modifications and variations can be made to the disclosed inclination angle compensation system. Other embodiments will be apparent to those skilled in the art from consideration of the specification and practice of the disclosed inclination angle compensation system. It is intended that the specification and examples be considered as exemplary only, with a true scope being indicated by the following claims and their equivalents.

What is claimed is:

1. A computer-implemented method of determining an inclination of a machine comprising:
   receiving a measured inclination angular rate of a machine measured by an inclination angular rate sensor;
   estimating an estimated inclination angle of the machine by integrating the measured inclination angular rate;
   estimating a non-gravitational acceleration of the machine based on the estimated inclination angle and an acceleration output from a forward acceleration sensor;
   receiving a measured inclination angle measured by an inclination angle sensor;
   determining an inclination angle sensor acceleration based on the measured inclination angle;
   calculating a corrected inclination angle of the machine based on the non-gravitational acceleration and the inclination angle sensor acceleration; and
   determining an a posteriori estimated inclination angle of the machine based on the corrected inclination angle,
   wherein the corrected inclination angle of the machine is calculated as:

$$\hat{\theta} = \sin^{-1}\left(\frac{A_i - A_{non-g}}{g}\right),$$

where $A_i$ is an inclination angle sensor acceleration calculated based on the inclination angle output, $A_{non-g}$ is the non-gravitational acceleration and g is a conventional acceleration due to gravity.

2. The computer-implemented method according to claim 1, wherein the non-gravitational acceleration of the machine is calculated as:

$$A_{non-g} = A - \hat{\beta}_A - g \sin \hat{\theta}^-,$$

where A is the acceleration output from the forward acceleration sensor, $\hat{\beta}_A$ is an acceleration bias estimate, g is a conventional acceleration due to gravity, and $\hat{\theta}^-$ is the estimated inclination angle.

3. The computer-implemented method according to claim 1, wherein the inclination angle sensor acceleration is determined as:

$$A_i = g \sin \theta,$$

where g is a conventional acceleration due to gravity and θ is the inclination angle output.

4. The computer-implemented method according to claim 1, wherein the estimated inclination angle is estimated using a predict phase of a Kalman filter.

5. The computer-implemented method according to claim 4, further including:
   outputting the corrected inclination angle to an update phase of the Kalman filter; and
   generating the a posteriori estimated inclination angle with the Kalman filter based on the corrected inclination angle and the estimated inclination angle from the predict phase of the Kalman filter.

6. An inclination angle compensation system for determining an inclination angle of a machine comprising:
an inclination angle sensor configured to measure an inclination angle of a machine;
an inclination angular rate sensor configured to measure an inclination angular rate of the machine;
an inclination angle estimator configured to:
receive the measured inclination angular rate from the inclination angular rate sensor; and
estimate an estimated inclination angle by integrating the inclination angular rate;
a non-gravitational acceleration estimator configured to estimate a non-gravitational acceleration of the machine based on the estimated inclination angle and an acceleration output from a forward acceleration sensor; and
an inclination angle sensor corrector configured to:
receive a measured inclination angle output from an inclination angle sensor;
determine an inclination angle sensor acceleration based on the measured inclination angle;
calculate a corrected inclination angle of the machine based on the non-gravitational acceleration and the inclination angle sensor acceleration; and
determine an a posteriori estimated inclination angle of the machine based on the corrected inclination angle,
wherein the corrected inclination angle of the machine is calculated as:

$$\breve{\theta} = \sin^{-1}\left(\frac{A_i - A_{non-g}}{g}\right),$$

where $A_i$ is an inclination angle sensor acceleration calculated based on the inclination angle output, $A_{non-g}$ is the non-gravitational acceleration, and g is a conventional acceleration due to gravity.

7. The system according to claim 6, wherein the non-gravitational acceleration estimator is further configured to calculate the non-gravitational acceleration of the machine as:

$$A_{non-g} = A - \hat{\beta}_A - g \sin \hat{\theta}^-,$$

where A is the acceleration output from the forward acceleration sensor, $\hat{\beta}_A$ is an acceleration bias estimate, g is a conventional acceleration due to gravity, and $\hat{\theta}^-$ is the estimated inclination angle.

8. The system according to claim 6, wherein the inclination angle sensor corrector is further configured to determine the inclination angle sensor acceleration as:

$$A_i = g \sin \theta,$$

where g is a conventional acceleration due to gravity and $\theta$ is the inclination angle output.

9. The system according to claim 6, wherein the inclination angle estimator is further configured to estimate the estimated inclination angle by implementing a predict phase of a Kalman filter.

10. The system according to claim 9, further including an inclination angle updater, wherein:
the inclination angle sensor corrector is further configured to output the corrected inclination angle to the inclination angle updater; and
the inclination angle updater is configured to generate the a posteriori estimated inclination angle by implementing an update phase of the Kalman filter based on the corrected inclination angle and the estimated inclination angle from the predict phase of the Kalman filter.

11. A non-transitory computer-readable storage device storing instructions for determining an inclination of a machine, the instructions causing one or more computer processors to perform operations comprising:
receiving a measured inclination angular rate of a machine measured by an inclination angular rate sensor;
estimating an estimated inclination angle of the machine by integrating the measured inclination angular rate;
estimating a non-gravitational acceleration of the machine based on the estimated inclination angle and an acceleration output from a forward acceleration sensor;
receiving a measured inclination angle measured by an inclination angle sensor;
determining an inclination angle sensor acceleration based on the measured inclination angle;
calculating a corrected inclination angle of the machine based on the non-gravitational acceleration and the inclination angle sensor acceleration; and
determining an a posteriori estimated inclination angle of the machine based on the corrected inclination angle,
wherein the corrected inclination angle of the machine is calculated as:

$$\breve{\theta} = \sin^{-1}\left(\frac{A_i - A_{non-g}}{g}\right),$$

where $A_i$ is an inclination angle sensor acceleration calculated based on the inclination angle output, $A_{non-g}$ is the non-gravitational acceleration and g is a conventional acceleration due to gravity.

12. The non-transitory computer-readable storage device according to claim 11, wherein the non-gravitational acceleration of the machine is calculated as:

$$A_{non-g} = A - \hat{\beta}_A - g \sin \hat{\theta}^-,$$

where A is the acceleration output from the forward acceleration sensor, $\hat{\beta}_A$ is an acceleration bias estimate, g is a conventional acceleration due to gravity, and $\hat{\theta}^-$ is the estimated inclination angle.

13. The non-transitory computer-readable storage device according to claim 11, wherein the estimated inclination angle is estimated using a predict phase of a Kalman filter.

14. The non-transitory computer-readable storage device according to claim 13, the instructions further causing the one or more computer processors to perform operations including:
outputting the corrected inclination angle to an update phase of the Kalman filter; and
generating the a posteriori estimated inclination angle with the Kalman filter based on the corrected inclination angle and the estimated inclination angle from the predict phase of the Kalman filter.

* * * * *